M. G. FAGAN.

Cooking-Stoves.

No. 5,208. Reissued Dec. 31, 1872.

Witnesses { Edmund Masson
John R. Young

Inventor.
M. G. Fagan, by
Prindle and Kg. his Attys

AM. PHOTO-LITHOGRAPHIC CO. N.Y. (OSBORNE'S PROCESS.)

UNITED STATES PATENT OFFICE.

MICHEL G. FAGAN, OF TROY, NEW YORK, ASSIGNOR TO HIMSELF AND ALBERT C. CORSE, OF SAME PLACE.

IMPROVEMENT IN COOKING-STOVES.

Specification forming part of Letters Patent No. 94,193, dated August 31, 1869; reissue No. 5,208, dated December 31, 1872.

*To all whom it may concern:*

Be it known that I, MICHEL G. FAGAN, of Troy, in the county of Rensselaer and State of New York, did invent certain new and useful Improvements in Cooking-Stoves, for which Letters Patent No. 94,193 were issued to me upon the 31st day of August, 1869, which Letters Patent have been found defective in that the specification and claims do not cover and embrace all of the original invention as shown in the model and described in the specification which were filed in the Patent Office upon the 2d day of June, 1869; now, therefore, being desirous of reissuing the said patent, I have prepared and do hereby declare that the following is a full, clear, and exact description of the said invention, reference being had to the accompanying drawing making a part of this specification, in which—

Figure 1:
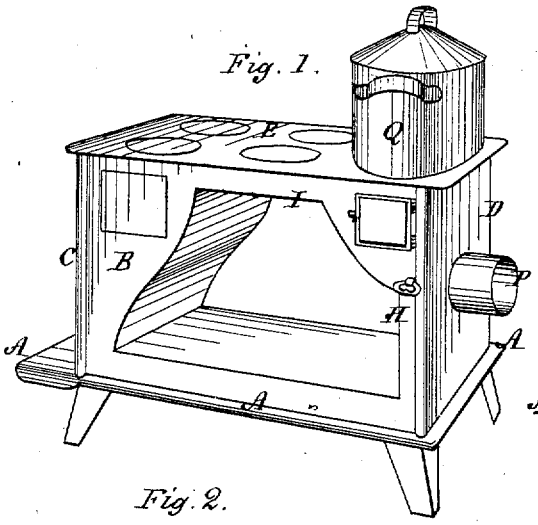
Figure 4:
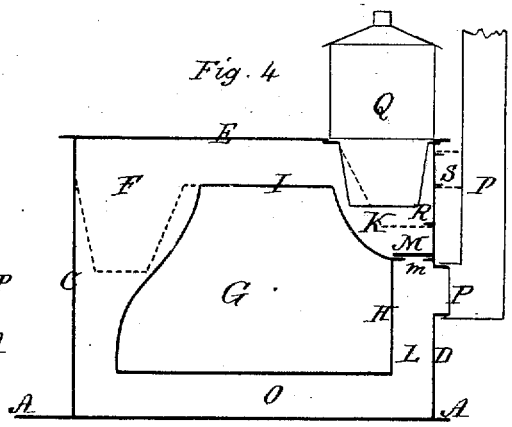
Figure 2:
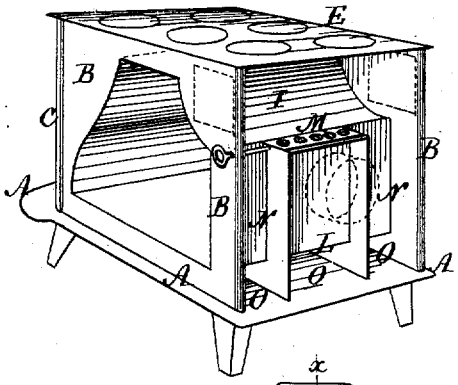
Figure 5:
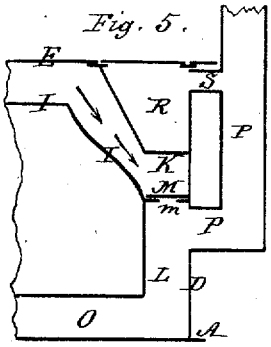
Figure 3:
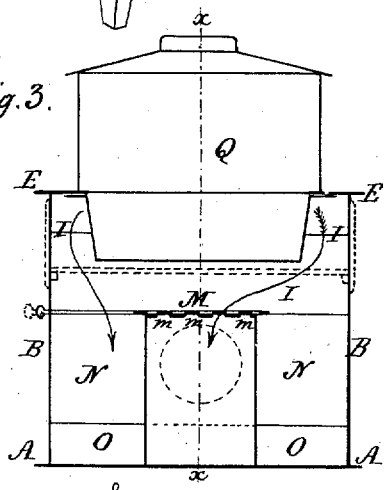
Figure 6:
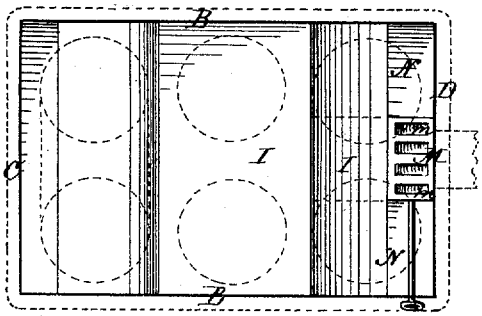

Figure 1 is a perspective view of my improved stove; Fig. 2 is a like view of the same with the back plate removed; Fig. 3 is a vertical cross-section upon a line extending through the center of the rear ascending and descending flues; Fig. 4 is a vertical section upon line *x x* of Fig. 3; Fig. 5 is a like view of the rear portion of the stove, showing the arrangement of parts necessary in order to convert the back chamber into a fire-box; and Fig. 6 is a plan view of the upper side of the stove with the top plate removed.

Letters of like name and kind refer to like parts in each of the figures.

The object of my invention is to increase the efficiency and ease of operation of a return-flue cooking-stove; and it consists principally in a cooking-stove provided at and within its rear end with a chamber or pit similar in general form to the fuel-chamber situated at the front of said stove, substantially as and for the purpose hereinafter specified. It consists, further, in constructing within the pit thus formed a second or supplementary fuel-chamber, substantially as and for the purpose hereinafter shown. It consists, further, in combining with the rear chamber or pit a water reservoir or boiler, substantially as and for the purpose hereinafter set forth. It consists, finally, in the relative arrangement of the top, rear, and exit flues, the rear chamber or pit, and the damper, substantially as and for the purpose hereinafter shown and described.

In the annexed drawing, A represents the bottom plate; B, the side plates; C and D, the front and rear plates; and E, the top plate of a stove containing a fuel-chamber, F, and oven G, all of usual construction. At a short distance in front of the line of the back oven-plate H the top oven-plate I extends downward and rearward to the former, as seen in Figs. 2 and 4, so as to form a pit or chamber, K, which, in general size and shape, corresponds to the like features of the pit within which the fuel-chamber is placed. The rear center or ascending flue L has its upper end inclosed by means of an extension of the rear end of the top oven-plate I, while in and through said inclosure are provided a number of openings, *m*, which correspond to similar openings formed within a damper, M, that rests upon said plate, by which means access to said flue from above can be controlled in the usual manner. The rear descending-flues N are open at their upper ends so that the heated escaping products of combustion, when the damper M is closed, will take the usual course downward through said flues N into the bottom oven-flues O and through the same into the rear ascending-flue L, and from the latter into the exit-flue P, which passes outward from near the upper end of the same. The chamber K, while encroaching but slightly upon the capacity of the oven, affords abundant space for the reception of a water-reservoir, Q. When the chamber is employed for the reception of a supplemental fuel-chamber, R, a direct connection is made between the upper rear side of the latter and the exit-flue P by means of a cross-pipe, S, which extends between the same, and is closed, when desired, by a damper of usual construction.

The supplementary fuel-chamber shown is intended for use in summer, or at times when the oven does not require heating, and as, from its position and direct connection with the exit-flue, but little heat is required in order to enable cooking to be done upon the rear portion of the stove, a material saving in fuel will be effected, and in summer less discomfort will be experienced from radiated heat.

This construction of parts preserves the outlines and proportions of the exterior of the stove, and renders it capable of use in the same manner and to the same extent as before, while, by means of the improvements named, the effective capacity of said stove is largely increased without a corresponding increase in cost, and in addition thereto it is capable of uses heretofore found impracticable.

Although preferably applied to a stove having three rear-end flues, it will be seen that these improvements are equally applicable to stoves having but two of such flues.

Having thus fully set forth the nature and merits of my invention, what I claim as new is—

1. A cooking-stove provided at and within its rear end and upper side with a chamber or pit similar in general form to the fuel-chamber situated at its front, substantially as and for the purpose specified.

2. A cooking-stove provided at or within its rear end and upper side with a second or supplemental fuel-chamber, substantially as and for the purpose shown.

3. In combination with the chamber or pit K, constructed at or within the rear end and upper side of the cooking-stove, the water-reservoir Q, substantially as and for the purpose set forth.

4. The relative arrangement of the top oven-flue, rear-end flues L and N, exit-flue P, rear chamber or pit K, and damper M within the rear end and upper side of the stove, substantially as and for the purpose shown.

In testimony that I claim the foregoing I have hereunto set my hand this 18th day of November, 1872.

MICHEL G. FAGAN.

Witnesses:
H. D. SIMMONS,
A. R. CORSE.